United States Patent
Tabone

(10) Patent No.: US 9,652,132 B2
(45) Date of Patent: May 16, 2017

(54) HANDLING TOUCH INPUTS BASED ON USER INTENTION INFERENCE

(71) Applicant: Google Inc., Mountain View, CA (US)

(72) Inventor: Ryan Tabone, San Francisco, CA (US)

(73) Assignee: Google Inc., Mountain View, CA (US)

( * ) Notice: Subject to any disclaimer, the term of this patent is extended or adjusted under 35 U.S.C. 154(b) by 310 days.

(21) Appl. No.: 13/752,342

(22) Filed: Jan. 28, 2013

(65) Prior Publication Data

US 2015/0212580 A1  Jul. 30, 2015

Related U.S. Application Data

(60) Provisional application No. 61/591,719, filed on Jan. 27, 2012.

(51) Int. Cl.
*G06F 3/01* (2006.01)
*G06F 3/0484* (2013.01)
*G06F 3/0485* (2013.01)
*G06F 3/0488* (2013.01)

(52) U.S. Cl.
CPC ........ *G06F 3/04842* (2013.01); *G06F 3/0485* (2013.01); *G06F 3/04883* (2013.01); *G06F 2203/04806* (2013.01)

(58) Field of Classification Search
CPC .......... G06F 2203/04806; G06F 17/24; G06F 17/22; G06F 2203/04808; G06F 3/0483; G06F 3/0484; G06F 3/04883; G06F 3/0485; G06F 3/04842; G06F 17/241; G06F 2203/0408
See application file for complete search history.

(56) References Cited

U.S. PATENT DOCUMENTS

| | | |
|---|---|---|
| 2002/0030667 A1 | 3/2002 | Hinckley et al. |
| 2003/0043174 A1 | 3/2003 | Hinckley et al. |
| 2004/0140984 A1 | 7/2004 | Hinckley et al. |
| 2004/0141009 A1 | 7/2004 | Hinckley et al. |
| 2004/0150630 A1 | 8/2004 | Hinckley et al. |
| 2006/0038796 A1 | 2/2006 | Hinckley et al. |
| 2007/0146337 A1 | 6/2007 | Ording et al. |
| 2008/0165141 A1 | 7/2008 | Christie |
| 2008/0168404 A1 | 7/2008 | Ording |
| 2009/0064031 A1 | 3/2009 | Bull et al. |
| 2009/0073194 A1 | 3/2009 | Ording |
| 2009/0228842 A1* | 9/2009 | Westerman et al. .......... 715/863 |
| 2009/0307633 A1 | 12/2009 | Haughay, Jr. et al. |
| 2010/0083111 A1* | 4/2010 | de Los Reyes ....... G06F 3/0482 715/702 |
| 2010/0231529 A1* | 9/2010 | Tikka .................. G06F 3/04883 345/173 |
| 2011/0018822 A1* | 1/2011 | Lin ..................... G06F 3/04883 345/173 |

(Continued)

*Primary Examiner* — Grant Sitta
*Assistant Examiner* — Amen Bogale
(74) *Attorney, Agent, or Firm* — McDermott Will & Emery LLP

(57) ABSTRACT

Users can navigate and manipulate content, such as by scrolling a document or selecting content in the document, by using various touch inputs that indicate a behavior that the user is trying to perform. In order to improve the user interface experience for a user, embodiments analyze touch inputs to determine when a user would like to perform a navigational jump and then execute such a jump, based on the specific touch inputs involved.

20 Claims, 9 Drawing Sheets

(56) References Cited

U.S. PATENT DOCUMENTS

| | | |
|---|---|---|
| 2011/0022985 A1 | 1/2011 | Ording et al. |
| 2011/0066984 A1 | 3/2011 | Li |
| 2011/0072388 A1* | 3/2011 | Merrell .............. G06F 3/0485 715/784 |
| 2011/0167360 A1* | 7/2011 | Aitken et al. ................ 715/760 |
| 2011/0167380 A1* | 7/2011 | Stallings et al. ............. 715/784 |
| 2011/0185299 A1* | 7/2011 | Hinckley et al. ............ 715/769 |
| 2011/0237303 A1* | 9/2011 | Matsuda ............ G06F 3/0485 455/566 |
| 2011/0252357 A1* | 10/2011 | Chaudhri ........... G06F 3/04883 715/780 |
| 2011/0265002 A1 | 10/2011 | Hong et al. |
| 2011/0291964 A1* | 12/2011 | Chambers et al. .......... 345/173 |
| 2012/0013541 A1* | 1/2012 | Boka et al. .................. 345/173 |
| 2012/0092268 A1* | 4/2012 | Tsai et al. .................... 345/173 |
| 2012/0110501 A1* | 5/2012 | Baek et al. .................. 715/800 |
| 2012/0159402 A1* | 6/2012 | Nurmi ................ G06F 3/04883 715/863 |
| 2012/0192056 A1* | 7/2012 | Migos ................. G06F 17/241 715/230 |
| 2012/0192117 A1* | 7/2012 | Migos et al. ................ 715/863 |
| 2012/0306772 A1* | 12/2012 | Tan .................... G06F 3/04842 345/173 |
| 2012/0306778 A1* | 12/2012 | Weeldreyer .......... G06F 3/0488 345/173 |

\* cited by examiner

Direction Analysis 600

Use Case 602A

Touch Input 604A    Touch Input 606A

Direction 610 A

Use Case 602B

Touch Input 604B    Touch Input 606B

Direction 610 B

Use Case 602C

Touch Input 604C    Touch Input 606C    Touch Input 608C

Direction 610 C

Use Case 602D

Touch Input 604D

Direction 610D

Mathematical Touch Analysis 700

Use Case 702A

Velocity Graph 702B

Use Case 704A

Velocity Graph 704B

Use Case 706A

Velocity Graph 706B

Use Case 708A

Acceleration Graph 708B

Use Case 710A

Acceleration Graph 710B

Use Case 712A

Acceleration Graph 712B

Navigational Jump Condition Detection 800

Use Case 802A

Touch Input
804A

Use Case 802B

Touch Input
804B

Use Case 802C

Touch Input
804C

Use Case 802D

Touch Input        Touch Input
804D                806D

Use Case 802E

Touch Input        Touch Input
804E                806E

HANDLING TOUCH INPUTS BASED ON USER INTENTION INFERENCE

CROSS-REFERENCE TO RELATED APPLICATIONS

The present application claims the benefit of priority under 35 U.S.C. §119 from U.S. Provisional Patent Application Ser. No. 61/591,719 entitled "Handling Touch Inputs Based on User Intention Inference," filed on Jan. 27, 2012, the disclosure of which is hereby incorporated by reference in its entirety for all purposes.

TECHNICAL FIELD

The field generally relates to handling one or more touch inputs on a computing device.

BACKGROUND

Users can manipulate computing interfaces, such as by moving a pointer or scrolling a document, through inputs such as touch surfaces by using various gestures that map to the behavior that the user is trying to perform. Some touch algorithms have a notion of acceleration incorporated into interpreting touch gestures. For example, they may provide that speed may increase by some multiplicative or exponential factor as a user performs a gesture faster.

However, in existing approaches, the resultant behavior speed will eventually reach some maximum speed. For example, existing approaches may include a set maximum speed threshold. Alternatively, it may only be practical to perform the underlying touch input up to a certain speed or acceleration. For example if a user swipes a finger to select or scroll content, or does a pinch gesture to zoom in or out, generally the user will only be able to physically execute the gesture with a certain speed or acceleration before it becomes impractical to perform the gesture faster.

In certain existing approaches, behaviors may simulate properties such as momentum or deceleration. For example, if a user performs repeated swipe gestures, scrolling content may accelerate and proceed to continue scrolling at a constant velocity until a subsequent touch input stops the scrolling, or may continue scrolling in a manner where the scrolling gradually decelerates if there is no additional swiping to maintain the scrolling speed.

SUMMARY

A computer-implemented method, system, and computer-readable storage medium are provided for handling one or more touch inputs on a computing device. Content is displayed in an application on a display coupled to the computing device. One or more touch inputs are received from a user at an input device coupled to the computing device. Each touch input is associated with a speed and a trajectory. The one or more touch inputs are analyzed to determine when the touch inputs indicate a navigational jump condition. When a navigational jump condition is determined, a navigational jump is then automatically performed in the application. This navigational jump may include generating updated content to be displayed based on the navigational jump and the original content. The updated content is displayed in the application on the display coupled to the computing device.

According to one aspect, a computer-implemented method may comprise displaying application content on a display associated with the computing device, receiving one or more touch inputs from a user at an input device associated with the computing device, determining the one or more touch inputs comprise a first gesture that corresponds to a user-selected portion of the application content, determining a unit of content based on the user-selected portion, determining the one or more touch inputs comprise a second gesture having a criteria of movement that satisfies a predetermined criteria, determining an amount of units based on the second gesture, and changing the display of the application content according to the determined amount. Other aspects include corresponding systems, apparatus, and computer program products.

The previously described aspects and other aspects may include one or more of the following features. For example, each touch input may be associated with a speed and trajectory, and wherein the predetermined criteria comprises at least one of a predetermined velocity and a predetermined direction. Additionally or in the alternative, each touch input may be associated with a speed and trajectory, and wherein the predetermined criteria comprises a velocity or acceleration curve. The one or more touch inputs may comprise a plurality of swipes across the display performed in succession. In this regard, the method may further comprise determining an overall navigation direction based on the direction of a swipe of the greatest magnitude, the magnitude being determined by at least one of a length of the swipe and a velocity of the swipe.

The one or more touch inputs may comprise two or more swipes across the display, each having a trajectory and direction within a predefined tolerance of each other. The first gesture may diagonally cross over the user-selected portion of the application content to indicate that the first gesture corresponds to the user-selected content. The user-selected portion may be a paragraph of the application content, and a unit of content comprises content forming a paragraph. Changing the display of the application content may comprise visually selecting a number of paragraphs for manipulation based on the determined amount and a direction of the second gesture. The user-selected portion may be a currently displayed portion of the application content, and wherein the unit of content comprises an area of the application content substantially equal to currently displayed portion, wherein changing the display of the application content comprises scrolling the application content according to a multiple of the area. Changing the display of the application content may comprise changing a zoom level for the application content.

In another aspect, a machine-readable medium having machine-executable instructions stored thereon, which when executed by a machine or computer cause the machine or computer to perform a method. In this regard, the method may comprise displaying application content comprising one or more units of content on a display coupled to a computing device, receiving one or more touch inputs from a user at an input device associated with the computing device, determining one or more gestures from the one or more touch inputs, determining a number of units of content based on the one or more gestures, and changing the display of the application content by an amount corresponding to the number of units of content. Other aspects include corresponding systems, apparatus, and computer program products.

The previously described aspects and other aspects may include one or more of the following features. For example, a unit of content may comprise an image or paragraph of text on a web page displayed by a web browser. A unit of content may comprise one or more features of the application content that are related to how the content is displayed in a particular environment. Additionally or in the alternative, the method may further comprise determining the one or more gestures comprises a first gesture that corresponds to a user-selected portion of the application content, selecting a unit of content based on the user-selected portion, and determining the one or more gestures comprises a second gesture that satisfies a predetermined criteria, wherein the number of units of content is determined based on at least one of a length of the second gesture, a velocity of the second gesture, an acceleration of the second gesture, and a trajectory of the second gesture. Changing the display may comprise performing a navigational jump that produces updated content from original content. Additionally or in the alternative, the method may further comprise determining that an acceleration or a velocity or a trajectory of the one or more gestures satisfies a predetermined criteria before the number of units of content is determined or the display is changed. Additionally or in the alternative, changing the display of the application content may comprise determining, based on the one or more gestures, whether to change the display of the application content by scrolling, selecting one or more content items, or changing a zoom level of the application content.

In a further aspect, a system may include an input device, a display screen, a processor, and a memory having instructions thereon. The instructions, when executed by the processor, may cause a computing device to display application content on the display screen, receiving one or more touch inputs from a user at the input device, determine one or more gestures from the one or more touch inputs, determine the one or more gestures satisfies a predetermined criteria, determine a number of units of content based on at least one of a length of the one or more gestures, a velocity of the one or more gestures, an acceleration of the one or more gestures, and a trajectory of the one or more gestures, and perform a navigational jump that produces updated content from original content, wherein the updated content differs from the original content by an amount corresponding to the number of units of content. The instructions may further cause the computing device to determine the one or more gestures comprises a gesture that encircles a user-selected portion of the application content, and determine a unit of content based on the user-selected portion.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION

Better handling of user touch inputs is needed. Simply accelerating and decelerating when using inputs to manipulate a document may not be sufficient to provide an interface that meets user needs. For example, a user may want to use an input or series of inputs to manipulate a document in a way that, rather than simply increasing the speed at which the manipulation occurs, directly performs a navigational jump. For example, a user may want to scroll to the end of a document, or change to a maximum zoom level. Alternatively, a user may want to indicate that he or she wants to manipulate a document in a way that is related to the structure or display units involved in the document. For example, a user may wish to scroll a set number of display screens, or select a set number of paragraphs.

However, at present technology does not provide an easy way to use touch inputs to perform navigational jumps as just discussed.

As discussed above, the purpose of embodiments is to help manage one or more touch inputs in a way that provides an interface that facilitates navigating and manipulating documents in an application. At a high level, embodiments operate by receiving inputs, inferring whether the inputs indicate that a user intends to perform a navigational jump, determining the nature of navigational jump to be performed, and performing an appropriate navigational jump based on the one or more touch inputs. For example, it may be possible to carry out some of these high level stages by analyzing user behavior. Such analysis of user behavior may be carried out in a way that customizes response to one or more touch inputs from various users. More detail about customizing will be provided below.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The figures, which will now be discussed in greater depth, discuss how various embodiments provide this functionality that helps process one or more touch inputs in a manner suited to a specific user to improve the user interface experience for the user.

Figure 1:
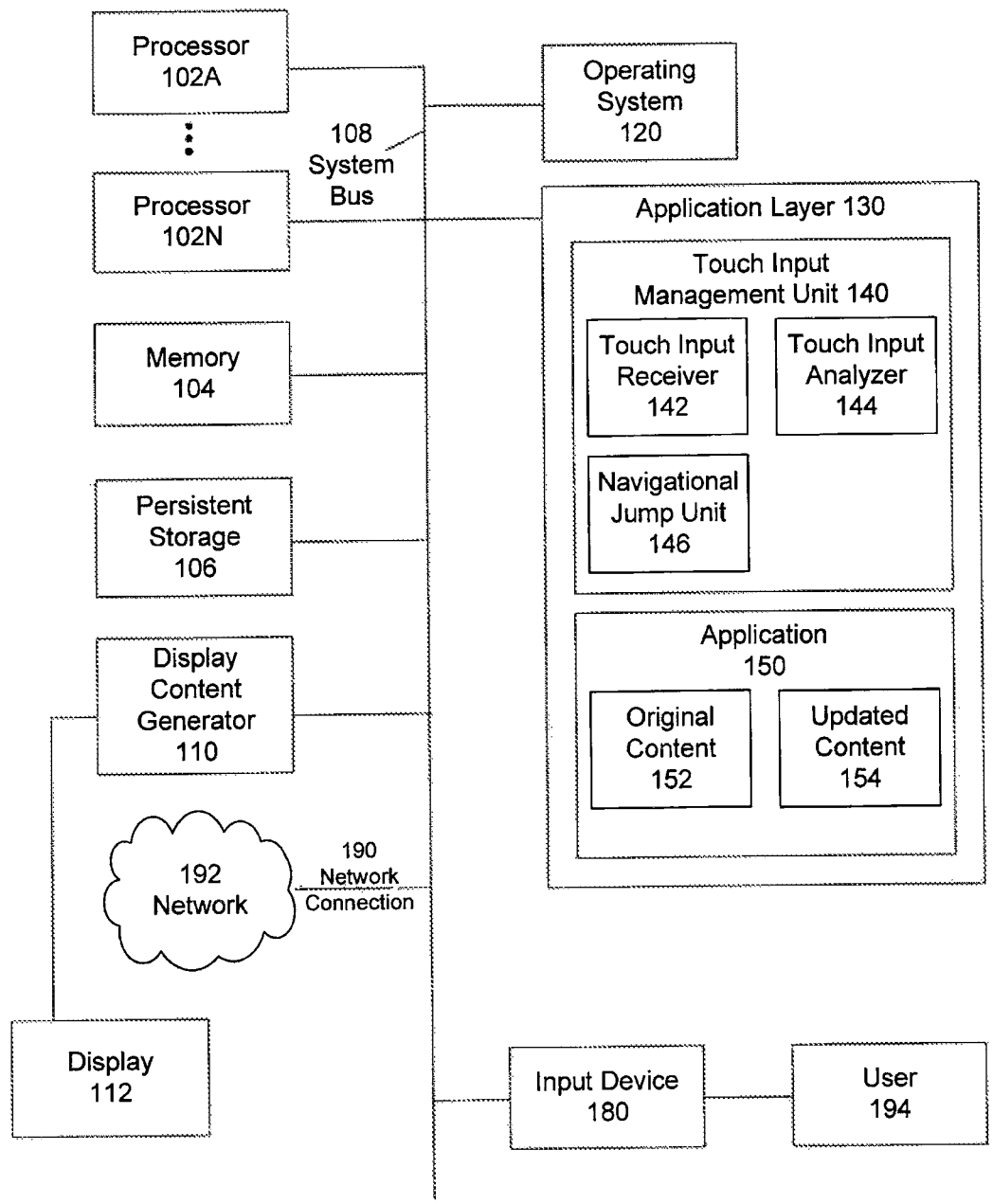
FIG. 1 is a diagram illustrating an exemplary system, according to an embodiment.

FIG. 1 is a diagram illustrating an exemplary system, according to an embodiment.

Each of the constituent parts of a system embodiment may be implemented on any computing device 100. Computing device 100 is coupled to a display 112, which displays content from display content generator 110 on behalf of computing device 100. Additionally, computing device 100 is communicatively coupled to at least one input device 180 that can receive one or more touch inputs from user 194.

For example, each input device 180 may be an input device that receives one or more touch inputs, such as a touchscreen or a touchpad. However, an embodiment is not necessarily limited to these types of input devices, and other types of input devices may be used (as will be discussed in greater depth below) in that provide one or more touch inputs. As noted, each touch input will be associated with a speed and a trajectory. For example, a typical touch input might involve a swipe that includes touching a touchscreen with a fingertip, and moving the fingertip along the touchscreen with a particular path at a particular speed. However, the one or more touch inputs may also involve multitouch touch inputs. Also, while FIG. 1 presents the case where there is one input device 180, it is certainly possible to receive touch input from more than one input device 180. For example, one or more touch inputs may be received from both a front touchscreen and a rear touchpad, and the one or more touch inputs may be analyzed together.

It may be noted that in the context of embodiments, each touch input is associated with a speed and a trajectory. Thus, a touch input which simply involves single point of contact and no movement, such as a tap gesture, is essentially a degenerate case in which the speed is zero and there is no trajectory. Hence, it may be possible to incorporate a tap gesture (or the like) into interpreting a plurality of touch inputs where at least some of the plurality of touch inputs involve motion, such as swipe or pinch gestures. However, tap gestures alone will not generally lead to determining that a navigational jump is appropriate.

Such computing device 100 can include, but is not limited to, a personal computer, mobile device such as a mobile phone, tablet, laptop, netbook, workstation, embedded system, game console, television, set-top box, or any other computing device 100. Further, computing device 100 can include, but is not limited to, a device having one or more processors 102A . . . 102N and a memory 104 for executing and storing instructions. Software may include one or more applications in an application layer 130 and an operating system 120. Display 112 may provide content from display content generator 110 that may provide a graphical user interface (GUI). Computing device 100 may also have multiple processors and multiple shared or separate memory components. For example, computing device 100 may be a clustered computing environment or server farm.

Each of the constituent parts of a system embodiment may be implemented in hardware, software, firmware, or any combination thereof, except for the display 112 and the at least one input device 180, which must be hardware devices. Likewise, modules or instructions that constitute operative parts of embodiments may utilize any type of structured memory, including a persistent memory.

It should be noted that computer-readable storage medium embodiments may include any physical medium which is capable of having instructions encoded thereon that may subsequently be executed by a processor to implement methods described herein. Example physical media may include floppy discs, optical discs (e.g. CDs, mini-CDs, DVDs, HD-DVD, Blu-ray), hard drives, random access memory (RAM), punch cards, tape drives, flash memory, and memory chips. However, any other type of tangible storage that can serve in the role of providing instructions to a processor may be used to store the instructions in these embodiments.

The diagram of FIG. 1 illustrates computing device 100 that contains a combination of hardware, software, and firmware constituent parts that allow it to run an application layer 130 with access to additional resources over a network 192 via a network connection 190. Computing device 100 is capable of receiving one or more touch inputs and using them to navigate and manipulate displayed content for subsequent updating and display. Computing device 100 as shown in FIG. 1 may be organized around a system bus 108, but any type of infrastructure that allows the hardware infrastructure elements of computing device 100 to communicate with and interact with each other may be used to function as this part of computing device 100.

The processing task in the embodiment of FIG. 1 is carried out by one or more processors 102A . . . 102N, but it should be noted that any type of processing technology may be used here, including multi-core processors, multiple processors, or distributed processors. Additional specialized processing resources such as graphics, multimedia, or mathematical processing capabilities may also be used as adjuncts or replacements for processors 102A . . . 102N for certain processing tasks.

In order to manipulate data, processors 102A . . . 102N access memory 104 via system bus 108. For data which needs to be stored more permanently, processors 102A . . . 102N access persistent storage 106. Processors 102A . . . 102N, memory 104 and persistent storage 106 operate in coordination with operating system 120 to provide basic functionality for computing device 100. Operating system 120 provides support functionality for application layer 130.

Application layer 130 includes several functional subsystems, which are depicted as being local to computing device 100 but may additionally be remote to computing device 100 and be accessed via network connection 190 over network 192. The functional subsystems, at a high level, are integrated into a touch input management unit 140. Additionally, application layer 130 encompasses an application 150 that manages content which is manipulated and navigated by a user 194 via inputs received at input device 180.

Touch input management unit 140 and application 150 each incorporate constituent parts that allow them to perform their functional roles in the context of computer device 100.

For example, touch input management unit 140 incorporate a touch input receiver 142, a touch input analyzer 144, and a navigational jump unit 146. These subsystems are configured to receive one or more touch inputs (performed by touch input receiver 142), interpret them to establish if a navigational jump is appropriate and if so, determine the characteristics of such a navigational jump (performed by touch input analyzer 144), and implement the navigational jump by cooperating with application 150 (performed by navigational jump unit). The operation of these subsystems will now be discussed further detail. The operation of these subsystems in the context of method embodiments is also discussed in greater detail, below, in conjunction with FIG. 2.

Touch input receiver 142 is communicatively coupled to the at least one input device 180. for example, this communicative coupling may in certain embodiments be facilitated by system bus 108, which allows information exchange between application layer 130 and input device 180. Application layer 130 may direct that information onto touch input receiver 142 at touch input management unit 140.

However, it will be recognized that many different architectures may suffice to provide communication between input device 180 and touch input receiver 142 so that when user 194 uses input device 180 to generate touch input events or otherwise generate signals corresponding to one or more touch inputs, touch input receiver 142 will detect the one or more touch inputs so that it may provide this information to touch input analyzer 144.

Touch input analyzer 144 analyzes the one or more touch inputs received by touch input receiver 142 and establishes whether the one or more touch inputs indicate if a navigational jump is appropriate. If a navigational jump is appropriate, it further establishes what parameters correspond to the navigational jump, based on interpreting the one or more touch inputs. This interpretation process is discussed in greater depth, below.

Once touch input analyzer 144 has determined that a navigational jump is warranted and what sort of navigational jump needs to be implemented, navigational jump unit 146 causes the navigational jump to actually take place. While specifics vary based on the various parameters that characterize the navigational jump itself, in general what occurs is that navigational jump unit 146 interacts with application 150 to execute the navigational jump. For example, one way in which this may occur is that navigational jump unit 146 may determine one or more instructions that represent the navigational jump, and instruct application 150 to execute these instructions instead of processing the one or more touch inputs in the ordinary way. For example, navigational jump unit 146 may instruct application 150 to scroll by a whole screen instead of doing the ordinary scrolling that would be associated with the one or more touch inputs that were received.

Application 150 can essentially be any application that displays content. For example, application 150 may be a web browser, but any other application that displays a document or another form of content may serve as application 150. For example, a word processor, an image editing program, a spreadsheet, or an e-mail program might display a document as part of an embodiment. Application 150 includes at least two types of content, original content 152 and updated content 154.

Original content 152 is content corresponding to a document in application 150 that reflects the state of the document before at least one touch input that signals a navigational jump has been received to navigate or manipulate the document. For example, original content 152 might be a web page that has just been loaded. However, original content 152 does not have to be content that has just been loaded. It may also include content in a state prior to doing a navigational jump. For example, original content 152 might include a spreadsheet where scrolling has occurred using ordinary approaches, where the spreadsheet is ready to perform a navigational jump based on an instruction to perform the navigational jump from navigational jump unit 146 within touch input management unit 140.

Updated content 154 is the result of subjecting original content 152 to the navigational jump. For example, updated content 154 might be a web page in which one or more touch inputs have caused application 150 (which in this example may be a web browser) to perform a navigational jump that causes application 150 to immediately produce updated content 154 from original content 152 in a manner that causes a maximum zoom.

Thus, application 150 manages generating original content 152 and updated content 154 in response to navigational jump instructions provided by the touch management unit 140 and its constituent parts. Once original content 152 and updated content 154 have been generated, application 150 interacts with display content generator 110 to produce display information corresponding to original content 152 and/or updated content 154. For example, original content 152 and updated content 154, if application 150 is a web browser, might include HTML content that defines a web page. The role of display content generator 110 is to ensure that the original content 152 and updated content 154 are rendered for display. Display content generator 110 subsequently causes the content to be displayed on display 112.

Computing device 100 will receive inputs for processing by touch input receiver 142 at touch management unit 140, as discussed above, from one or more input devices 180 into which user 194 may enter touch inputs. Embodiments may employ a wide variety of devices as input devices 180. While in general, as noted above, each input device 180 will be a touch input device such as a trackpad or touchscreen, it will be recognized that many other types of input device 180 may prove relevant to certain embodiments. For example, a mouse may allow user 194 to perform certain movements of the mouse as a whole or of a mouse wheel that may constitute inputs that touch input analyzer 144 may use to identify a navigational jump. Multiple input devices may each provide data to touch input receiver 142 to be gathered by touch input receiver 142 for processing by touch input analyzer 144. In an example, input device 180 and display 112 may also be coupled as a touchscreen display.

Additionally, it should be noted that one or more touch inputs may take on a variety of forms. First, it should be noted that touch inputs need not include direct contacts between a finger and a trackpad or touchscreen. It is certainly possible that a physical aid such as a stylus or appropriate gloves may facilitate the touch input process. Furthermore, touch inputs are not limited to simple contacts or even swipe gestures. Touch inputs may include a full range of multitouch inputs, such as pinch gestures.

Additionally, part of what touch input analyzer 144 does is to determine relationships between individual touch inputs. This analysis is detailed in greater depth below, but the overall goal of this analysis is essentially to determine if the nature of one or more touch inputs indicate that user 194 wants to perform a navigational jump, as opposed to ordinary navigation and/or document manipulation. Specific examples of this are discussed below.

Computing device 100 may use network connection 190 to communicate with other processing machines via network 192. Network connection 190 may be a wired connection such as Ethernet, token ring, optical, DSL, cable, or telephone connections in conjunction with an appropriate modem. Similarly, appropriate wireless technology may be used to act as network connection 190 to access network 192. Network 192 may be the Internet, a local area network, or any other network 192 of machines with which computing device 100 may exchange data.

Each of the information storage parts of the computing device 100 may be stored in any type of structured memory, including a persistent memory, and may take the form of a database, including a relational database, as noted above.

Overview of the Method

Figure 2:
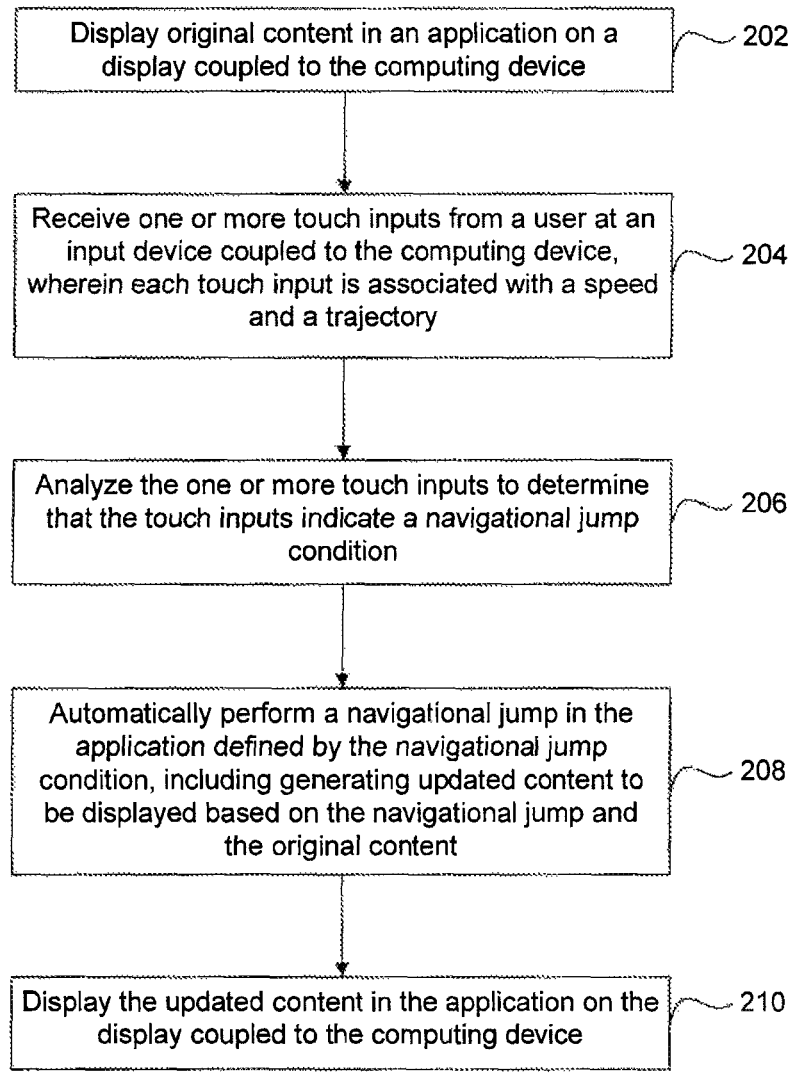
FIG. 2 is a flowchart of the method of one embodiment.

FIG. 2 is a flowchart of the method of one embodiment (stages 202-210).

In stage 202, original content is displayed in an application on a display coupled to the computing device. For example, stage 202 may proceed by having application 150 generate original content 152, and transmit the content via system bus 108 to display content generator 110, which can then proceed to display the content on display 112. As noted, the application can be any application that can display content and allow navigation and manipulation of the content. The role of stage 202 is to present initial content to user 194 so that user 194 is able to view original content 152 and decide what type of navigation and/or manipulation are desired to be performed in subsequent steps.

In stage 204, one or more touch inputs are received from a user at an input device coupled to the computing device, wherein each touch input is associated with a speed and a trajectory. For example, stage 204 may involve receiving inputs at input device 180 from user 194. Input device 180 relays the inputs via system bus 108 to touch input receiver 142 within touch input management unit 140 of computing device 100. Input device 180, will usually be a touchscreen, touchpad, or some other sort of input device 180 that allows user 194 to enter one or more touch inputs. However, these named input devices are not intended to be limiting. As discussed above, it may be realized that other input devices, such as mice, digitizers, and so on, may legitimately act as input devices 180 that provide one or more touch inputs to be received by touch input receiver. For example, the input devices 180 can use technology such as interrupts to alert computing device 100 that input is ready, and touch input receiver 142 will fetch the one or more touch inputs so that they may subsequently be processed.

In stage 206, the one or more touch inputs are analyzed to determine that the one or more touch inputs indicate a navigational jump condition. For example, touch input analyzer 144 within touch input management unit 140 will have received information about the one or more touch inputs provided from user 194 by input device 180. Touch input analyzer 144 initially establishes whether a navigational jump condition has occurred, based on the one or more touch inputs. If so, touch input analyzer 144 proceeds to establish various aspects of the navigational jump condition that define it so that it may be performed. Various aspects of the analysis will be discussed below. However, in general, touch input analyzer 144 looks for characteristics of the one or more touch inputs, including trajectory and speed, that reflect that the one or more touch inputs are directed not merely to manipulating and navigating content in a way that gets faster and faster, but instead should actually take the further step of simply jumping to a specific manipulation or navigation. While examples will be provided later, the role of touch input analyzer is to recognize a jump is desired in circumstances where user 194 does something that goes beyond ordinary manipulation and navigation. Examples include swiping extremely fast or swiping such that the swipe goes off-screen. Furthermore, as discussed with respect to FIG. 9, user-specific information may be incorporated into making such a determination.

In stage 208, a navigational jump is automatically performed in the application defined by the navigational jump condition, including generating updated content to be displayed based on the navigational jump and the original content. For example, stage 208 may involve navigational jump unit 146 causing application 150 to generate updated content 154 from original content 152. As discussed previously, the navigational jump may potentially be performed in a variety of ways. Navigational jump unit 146 will generally send an instruction to application 150 detailing the characteristics of the navigational jump, and application 150 will execute the instruction and produce updated content 154 that represents the results of applying that instruction to original content 152.

In stage 210, the updated content is displayed in the application on the display coupled to the computing device. For example, stage 210 may be carried out in a manner that is generally similar to the execution of stage 202 in that display content generator 110 can process content for subsequent display at 112. However, at stage 210 what is to be displayed is not original content 152, but instead updated content 154 that incorporates the results of performing the navigational jump.

Figure 3:
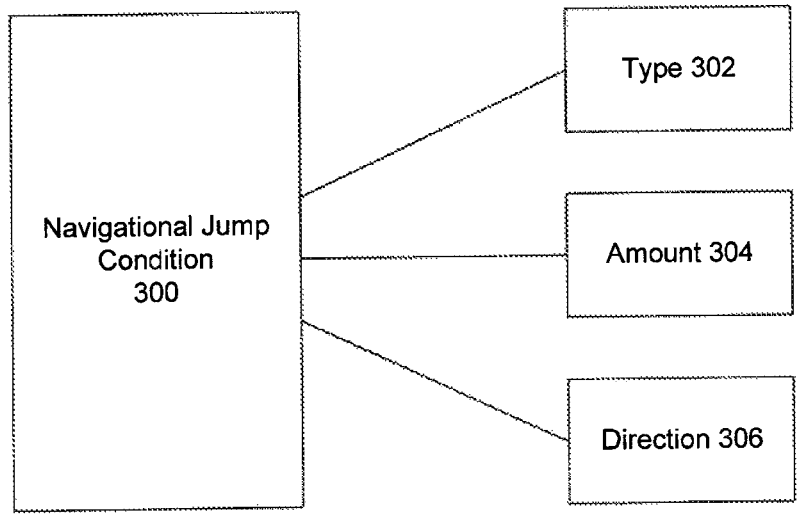
FIG. 3 is a diagram of information included in a navigational jump condition.

FIG. 3 is a diagram of information included in a navigational jump condition. In FIG. 3, a navigational jump condition 300 is characterized as including three components: type 302, amount 304, and direction 306. Essentially, navigational jump condition 300 is an identification of what needs to be done by application 150 to modify original content 152 so that it becomes updated content 154, which may subsequently be readied for display on display 112 by display content generator 110. Each of these three components is discussed in greater depth below. For example, type 302 is discussed in connection with FIG. 4, amount 304 is discussed in connection with FIG. 5, and direction 306 is discussed in connection with FIG. 6. It may be noted that an embodiment may include more information in a navigational jump condition 300, especially if a single navigational jump condition 300 is meant to encompass more than one form of manipulation and/or navigation operation.

However, while compound navigational jump conditions 300 (for example, to scroll down by a page and then select the remainder of the content) are possible, in general a navigational jump condition 300 will only need to define type 302, amount 304, and direction 306 so that navigational jump unit 146 has enough information available to implement the navigational jump. It should also be noted that these three pieces of information may each assume values that are only valid in certain contexts. For example, a direction 306 that is valid when type 302 is scrolling content may not make sense in the context when type 302 is changing zoom level for content.

Figure 4:
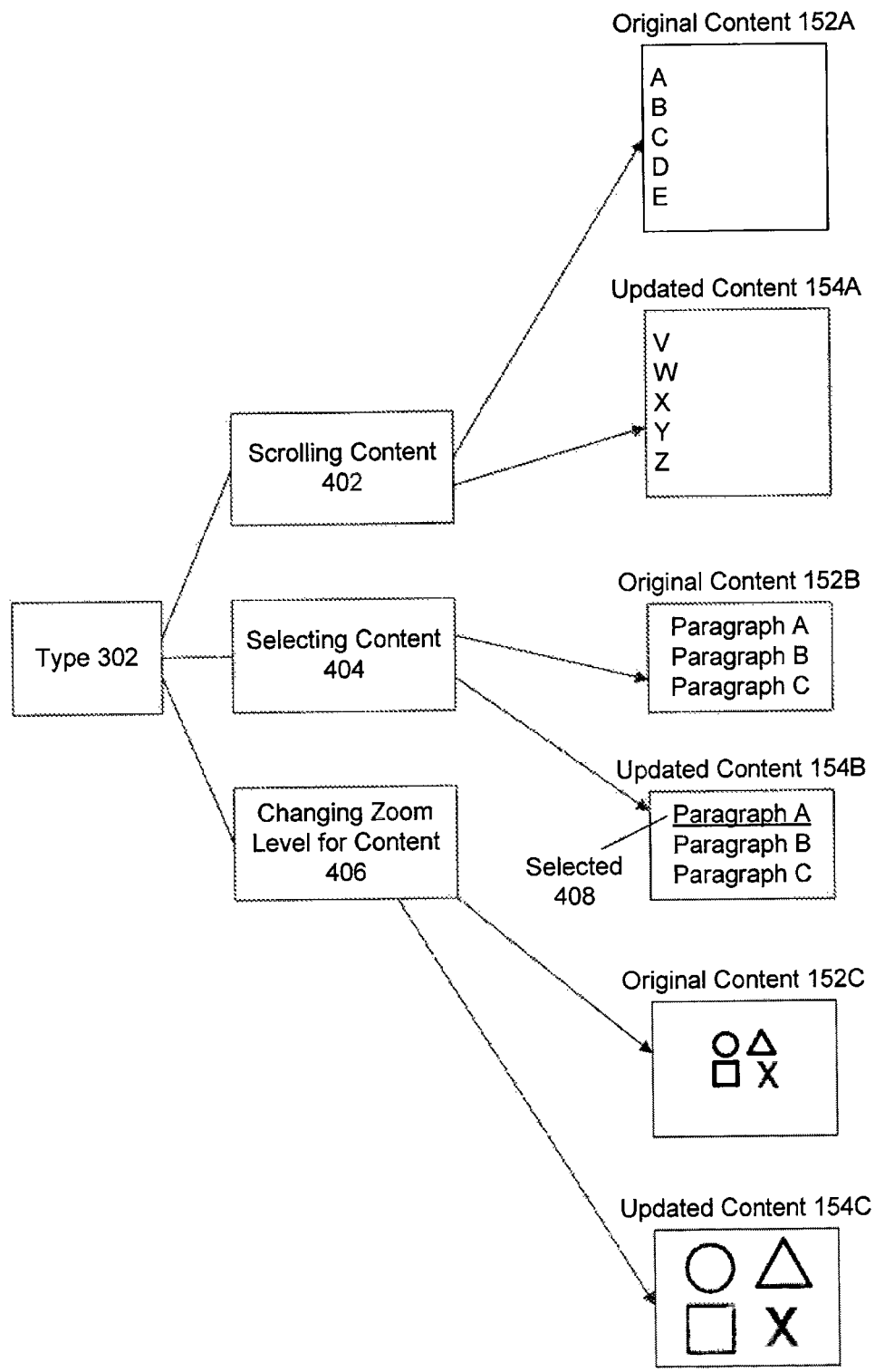
FIG. 4 is a diagram showing examples of different potential types of navigational jumps.

FIG. 4 is a diagram showing examples of different potential types of navigational jumps. As discussed previously, navigational jump condition 300 is associated with at least one type 302. Three example types of navigational jumps, illustrated by example in FIG. 4, are scrolling content 402, selecting content 404, and changing zoom level for content 406. Each of these types (which are only examples, other types of navigational jumps exist and may be part of an embodiment, such as rotations, which are not discussed in depth here, but will be recognized as a valid part of an embodiment) performs a manipulation of original content 152, so that it becomes updated content 154, such that updated content 154 differs from original content 152 in a manner that is dependent on the relevant type 302.

For example, scrolling content 402 is illustrated by showing original content 152A and updated content 154A that might result from navigational jump condition 300 where type 302 is scrolling content 402. Original content 152A shows an example document. The example document includes the alphabet, where each letter is listed on a separate line. Updated content 154A illustrates that type 302 associated with scrolling content 402 is a scrolling operation that navigates directly from the top of the document to the bottom of the document. In the context of this example, amount 304 is a whole document (which is a type of structural unit) and direction 306 is down (assuming that the touch inputs which cause the scrolling move from top to bottom of the touchscreen or touchpad). More detail about potential amount 304 and direction 306 choices will be provided below.

As another example, selecting content 404 is illustrated by showing original content 152B and updated content 154B that might result from navigational jump condition 300 where type 302 is selecting content 404. Selecting content generally pertains to highlighting at least one area of content for manipulation. For example, selecting may precede applying an operation to an area of content, such as changing formatting or performing a cut operation. Original content 152B shows an example document. The example document includes the three paragraphs, labeled paragraph A, paragraph B, and paragraph C. Updated content 154B illustrates that type 302 associated with selecting content 402 is a selecting operation that manipulates the document by selecting one paragraph. In FIG. 4, at updated content 154B, Paragraph A is marked selected 408 in that it is underlined. In the context of this example, amount 304 is one structural unit of the document (one paragraph) and direction 306 is down (assuming that the touch inputs which cause the selection move from top to bottom of the touchscreen or touchpad). More detail about potential amount 304 and direction 306 choices will be provided below.

As another example, changing zoom level for content 406 is illustrated by showing original content 152A and updated content 154C that might result from navigational jump condition 300 where type 302 is changing zoom level for content 406. Original content 152C shows an example document. The example document includes a picture of several geometric shapes. In the example, the shapes are sized based on a zoom level of 100%. Updated content 154C illustrates that type 302 associated with changing zoom level for content 406 is a zooming operation that zooms into the content. In the context of this example, amount 304 is a doubling (from 100% to 200% zoom level) and direction 306 is increasing zoom. It may be noted that doubling zoom level may be characterized as an amount that is one display unit. More detail about potential amount 304 and direction 306 choices will be provided below.

Figure 5:
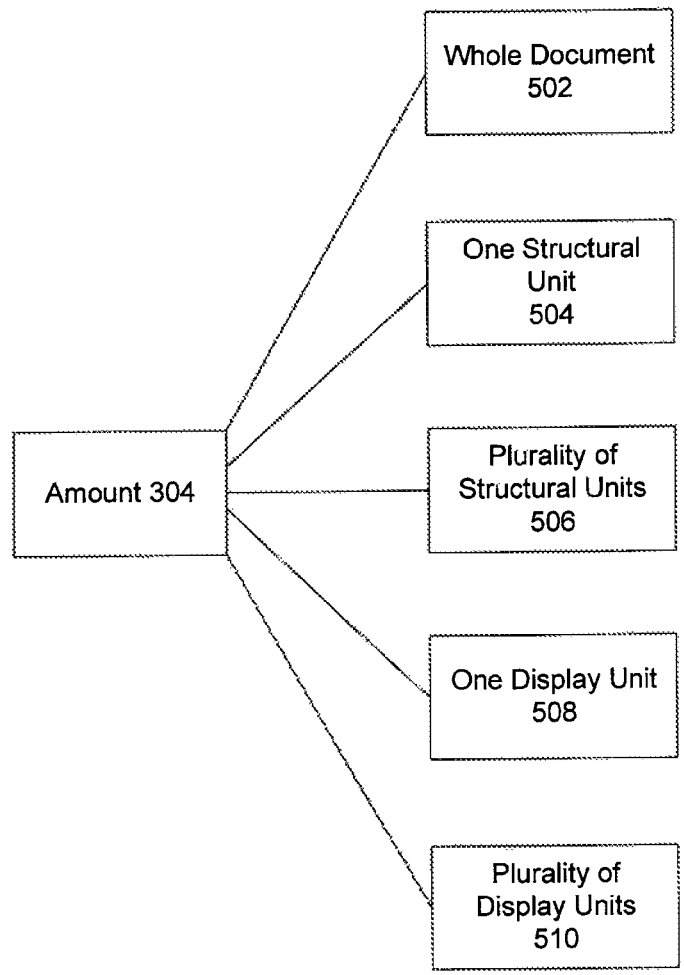
FIG. 5 is a diagram showing examples of different potential amounts of navigational jumps.

FIG. 5 is a diagram showing examples of different potential amounts of navigational jumps. Amount 304 defines, for navigational jump condition 300, how much of the document should be involved in the navigational jump. It should be noted that amount 304 may vary, and FIG. 5 presents several examples, including: a whole document 502, one structural unit 504, a plurality of structural units 506, one display unit 508, or a plurality of display units 510. It should additionally be noted that various amounts 304 are only relevant for navigational jump condition 300 where the type 302 causes a given value of amount 304 to make sense. However, in general, amount 304 defines a structural or display unit, or number of structural or display units. A whole document 502 is a special case of a structural unit, and structural and display units can include not only atomic structural and display units (such as one paragraph or one screen) but also compound structural and display units (that include multiple constituent parts). More discussion of structural and display units is provided below.

For example, if amount 304 is a whole document 502, the navigational jump condition pertains to a manipulation or navigation operation that encompasses the whole document in the navigational jump. Involving whole document 502 makes sense in the context of a scrolling content 402 jump or a selecting content 404 jump. In these cases, there would be a jump from beginning to end or vice versa by scrolling content. For a selecting content jump 404, a whole document would be involved.

For an amount that is one structural unit 504 or a plurality of structural units 506, it is first important to specify what is meant by a structural unit of a document. A structural unit of a document is intended to refer to a portion of content of a document that is an inherently meaningful portion of the document based on the structure of the document. For example, a structural unit might defile a column of a spreadsheet, a paragraph of a text document, or a slide in a presentation document. Hence, such amounts might facilitate selecting one or more paragraphs with one or more touch inputs, for example.

For a display unit 508, or a plurality of display units 510, a display unit refers to a portion of the document whose identity as portion from the way a document is displayed, for example, an area of content substantially equal to a currently displayed portion of application content. There is a certain degree of overlap been structural units and display units, but they are not identical. For example, in a presentation document, an individual slide could be considered both a structural unit or a display unit. However, for a document in a web browser, the structural units might include portions of content such as specific images or paragraphs of text. By contrast, display units would be directed to features of the content that are related to how the content is displayed in a particular environment. In the context of a scrolling content 402 jump, display units might allow scrolling to advance the content by one or a plurality of screens of content within the document. For example, a current display of application content may be changed by scrolling the application content according to a multiple of the area defined by the display unit.

In the context of a selecting content 404 jump display units might allow scrolling to select the content included in one or a plurality of screens of content within the document.

However, other types of display units may be relevant to other types of navigational jump conditions, such as changing zoom level for content 406. In this case, amount 304 defines how much the zoom level will change for a given navigational jump of this type. In the content of this type of navigational jump, display units might mean increments of zoom level (such as increasing or decreasing zoom by 25%) or proportional changes (double or halving the zoom level).

Figure 6:
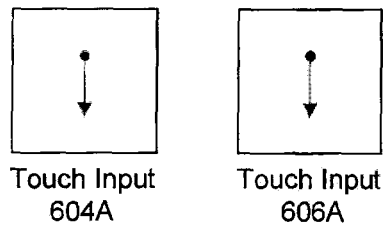
FIG. 6 is a diagram showing use cases that illustrate how embodiments may perform direction analysis.
Figure 6:
Figure 6:
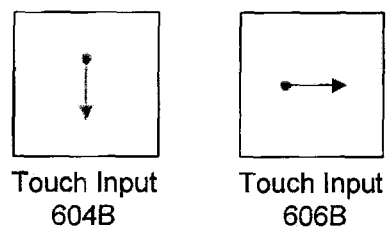
Figure 6:
Figure 6:
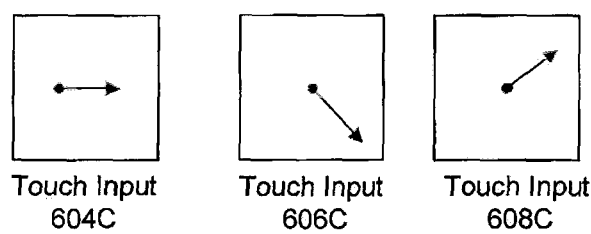
Figure 6:
Figure 6:
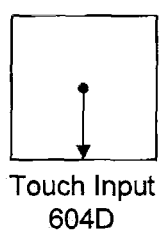
Figure 6:

FIG. 6 is a diagram showing use cases that illustrate how embodiments may perform direction analysis. In direction analysis 600, touch input analyzer 144 considers information associated with the one or more touch gestures to establish characteristics of navigational jump condition 300. Determination of type and amount will be discussed separately. However, FIG. 6 illustrates use cases that clarify how various one or more touch inputs lead to determined directions for navigational jump condition 300.

Generally the purpose of direction analysis 600 is to infer, from the speed and trajectory of the various touch input, not only how much of a navigational jump should be performed (which will lead to a determination of amount 304), but also to determine a path that defines how the navigational jump should be implemented. Essentially, direction analysis determines what the overall purpose of the touch inputs is, in terms of what specific manipulation or navigation is desired. For example, direction analysis in the context of an e-reader might establish whether to jump to earlier in the document or later.

Use cases presented in FIG. 6 clarify how various directions are determined. It is then be discussed how various example groups of one or more touch inputs are analyzed to detect and implement specific navigational jumps.

For example, use cases 602A-D are presented in FIG. 6 as examples of direction analysis 600.

Use case 602A corresponds to a very simple case in which two touch inputs, touch input 604A and touch input 606A are both similar downward swipes, performed in succession. Direction analysis 600 may process this data to yield direction 610A, which points to the bottom of the content. Note that direction 610A does not identify the type or amount of the navigational jump.

Use case 602B corresponds to a case in which two touch inputs, touch input 604B and touch input 606B are perpendicular swipes, performed in succession. Direction analysis 600 may process this data to yield direction 610B, which indicates proceeding down and to the right at the same time. For example, such an approach might scroll down by one display unit and right by one display unit. As noted before direction 610B does not identify the type or amount of the navigational jump. However, direction analysis 600 may process this use case 602B, which is somewhat ambiguous compare to use case 602A, in various ways. For example, direction analysis 600 may decide to use a preexisting standard to decide on direction. As an alternative result, the direction for use case 602B could instead be chosen to be down, if the direction of touch input 604B is chosen because it was entered first. Another alternative approach would be to decide that the direction for use case 602B is to the right because it was the most recently entered input. Alternatively, the direction of the gesture that is faster could be chosen, or other approaches may be taken to determine only one direction rather than combing directions from different inputs.

Use case 602C corresponds to a the case in which three touch inputs, touch inputs 604C, touch input 606C, and touch input 608C are both similar swipes, performed in succession. Direction analysis 600 may process this data to yield direction 610C, which points to the right of the content. The concept illustrated by use case 602C is that even though touch inputs 604C, 606C, and 608C are not all directed to the right, they are all within a certain tolerance of pointing to the right. Thus, use case 602C again illustrates that direction analysis incorporates information from the trajectories of the touch inputs to infer the overall intent of the user. In this context, it is relatively easy for direction analysis 600 to establish that a direction 610C that is directly to the right is appropriate. However, it should also be remembered that other information may factor into directional analysis 600. For example, the overall navigation direction may be determined based on the direction of a swipe of the greatest magnitude, the magnitude being determined by at least one of a length of the swipe and a velocity of the swipe. In this regard, direction 610C might be determined to point up and to the right, if touch input 608C was executed dramatically faster than touch inputs 604C or 606C, or direction 610C might be determined to point down and to the right if the trajectory of touch input 606C covered a dramatically longer path than that of touch inputs 604C and 608C. Note that direction 610C does not identify the type or amount of the navigational jump.

Use case 602D corresponds to a very simple case in which one touch input, touch input 604D is analyzed to determine direction. Unlike other cases, only one touch input is sometimes able to indicate that a navigational jump is appropriate. (This situation may occur when, as illustrated, the touch input continues up to or past the edge of input device 180.) Direction analysis 600 may process this data to yield direction 610D, which points to the bottom of the content (there is no ambiguity, as the trajectory of touch input 604D has a very clear direction to it). Note that direction 610A does not identify the type or amount of the navigational jump.

These use cases are only intended as illustrative examples. Many other types of direction analysis 600 are possible. For example, direction analysis 600 may be performed on multitouch gestures, such as a pinch gesture. Direction analysis can determine whether the user wants to zoom in or out, as well as a point towards which to zoom in or out. Similarly, multitouch inputs may be involved in direction analyses for other types of multitouch interface implementations, such as for a multitouch instruction to perform a rotation. As noted, direction analysis 600 is intended to infer what the user wants to do to interact with the content. As such, direction analysis 600 may generate different results depending on which user is the source of the one or more touch inputs (such an embodiment is discussed in greater depth in connection with FIG. 9).

Additionally, touch inputs have been characterized as having one dominant, easily determined direction. A user may want, for example, to select a structural unit of a document by using a touch gesture that encircles that unit. For example, a user could potentially indicate that he or she wishes to select a portion of content, or group of content items, by drawing a gesture that diagonally crosses over the user-selected portion of the application content to indicate that the first gesture corresponds to the user-selected content, for example, from the upper left to the lower right of the content, and/or from the upper right to the lower left of the content. Direction analysis 600 allows beginning with such touch inputs, and subsequently interpreting it to infer that the area of content which has been marked with crossing touch inputs is the area of interest to user 194, and this area is what is relevant to the navigational jump.

Figure 7:
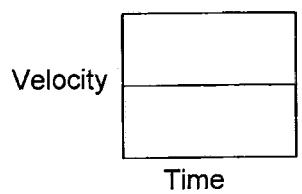
FIG. 7 is a diagram showing use cases that illustrate how embodiments may perform mathematical touch analysis.
Figure 7:
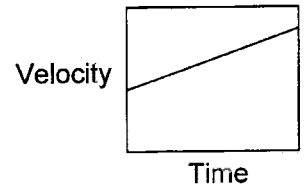
Figure 7:
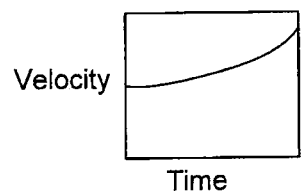
Figure 7:
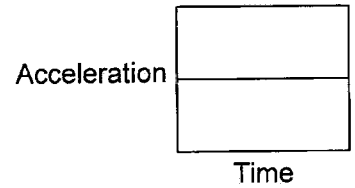
Figure 7:
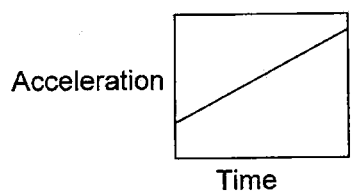
Figure 7:
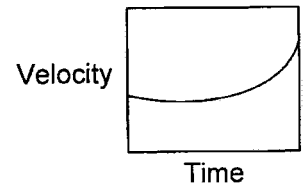

FIG. 7 is a diagram showing use cases that illustrate how embodiments may perform mathematical touch analysis.

FIG. 7 provides use cases that illustrate simple scenarios for mathematical touch analysis 700, an approach that mathematically models aspects of the one or more touch inputs and, based on the mathematical models, decides whether a navigational jump is appropriate. The mathematical modeling can also help determine the amount and/or direction of a navigational jump, when one is appropriate.

Mathematical touch analysis 700 may be carried out and implemented at touch input analyzer 144 within touch input management unit 140 to determine that one or more touch inputs include a gesture having a criteria of movement that satisfies a predetermined criteria. Touch input receiver 142 provides information about the one or more touch inputs to touch input analyzer 144, which processes the information to characterize various aspects of the touch inputs as conforming to one or more predetermined mathematical models, such as velocity or acceleration curves. Such curves may be produced by touch input analyzer 144 by receiving information from touch input receiver 142, such as locations of points of contact at a series of successive times. For example, touch input receiver 142 may represent a swipe gesture as a series of recorded finger positions at specific times. By performing appropriate mathematical analysis, touch input analyzer 144 can determine velocities and accelerations the characterize the touch inputs provided by touch input receiver 142 and use them as will now be discussed to help interpret user intent.

Mathematical touch analysis 700 generally considers velocities and accelerations of one or more touch inputs that could potentially indicate that a navigational jump is necessary. Use cases 702A, 704A, and 706A represent a few different example velocity models. Similarly, use cases 708A, 710A, and 712A represent a few different example acceleration models. It is to be noted that these are simple examples, and mathematical touch analysis can involve much more complicated velocity and acceleration analysis when trying to ascertain if a navigational jump is appropriate, and if so, which one.

Velocity and accelerations are both vector quantities, and possess both magnitude and direction. However, as discussed, the directions involved with one or more touch inputs are generally considered separately in direction analysis as provided for in the context of FIG. 6. Hence, mathematical touch analysis 700 is directed towards models of the magnitudes of velocity and acceleration. It may be noted that the magnitude of velocity is also referred to as speed.

As noted, use cases 702A, 704A, and 706A each correspond to velocity graphs 702B, 704B, and 706B. Each graph represents a simplified model of how velocity of one or more touch inputs change over time. Velocity graph 702B reflects a scenario where the velocity of touch inputs remains constant. As there is no increase in velocity over time, this type of velocity graph generally does not indicate that a navigational jump is appropriate.

Velocity graph 704B reflects a scenario where the velocity increases in a linear fashion. However, the speed increase is not dramatic as the increase is proceeding at a constant rate. Hence, touch gestures corresponding to acceleration graph 704B may or may not be chosen to indicate that a navigational jump condition is present. In this case, the gesture speed is increasing, but it may not be deemed to increase enough to warrant a jump as opposed to simply accelerating scrolling, or otherwise handing the touch gestures in an ordinary manner.

Velocity graph 706B reflects a scenario where the velocity in a way that is even faster than linear (i.e. quadratic, exponential, etc.) Not only is the speed of the gestures increasing, but the rate at which the gesture speed is increasing is increasing as well. Hence, in such scenarios, it is usually appropriate to invoke a navigational jump.

In addition to deciding that a navigational jump is appropriate, information about velocity may also suggest what amount 304 values are appropriate (for example, deciding whether to scroll by a complete screen or to the actual end of the document).

Similarly, 708A, 710A, and 712A represent acceleration models. Two cases which is not shown is the case in which there is no acceleration. In this case, velocity remains constant, and velocity will look like velocity graph 702B. It may also be noted that in this case, if velocity is already 0, it will remain O. As discussed, if there is no change in velocity, or if velocity is O. there is no reason to define a navigational jump based on a mathematical analysis of the one or more touch inputs.

Acceleration graphs 708B, 710B, and 712B represent acceleration scenarios. In acceleration graph 708B, acceleration is increasing in a linear fashion. In acceleration graph 710B, acceleration is increasing in a way that is even faster than linear (i.e. quadratic, exponential, etc.). While acceleration graph 708B indicates that touch gestures are increasing in speed, the speed increase is not dramatic as the increase is proceeding at a constant rate. Hence, touch gestures corresponding to acceleration graph 708B may or may not be chosen to indicate that a navigational jump condition is present. As discussed, the gesture speed is increasing, but it may not be deemed to increase enough to warrant a jump as opposed to simply accelerating scrolling, or otherwise handing the touch gestures in an ordinary manner.

However, acceleration graphs 710B and 712B indicate that not only is the speed of the gestures increasing, but the rate at which the gesture speed is increasing is increasing as well. Hence, in such scenarios, it is usually appropriate to invoke a navigational jump.

As discussed for velocity information, in addition to deciding that a navigational jump is appropriate, information about acceleration may also suggest what amount 304 values are appropriate (for example, deciding whether to scroll by a complete screen or to the actual end of the document).

Figure 8:
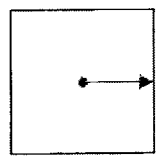
FIG. 8 is a diagram showing use cases that illustrate how embodiments may perform navigational jump condition detection.
Figure 8:
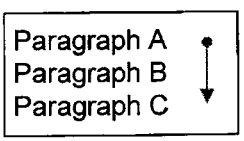
Figure 8:
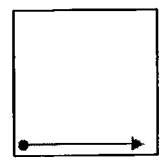
Figure 8:
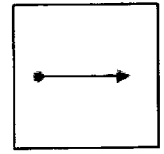
Figure 8:
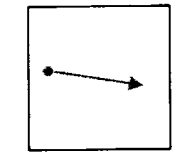
Figure 8:
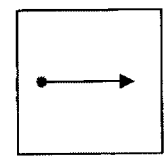
Figure 8:
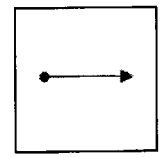

FIG. 8 is a diagram showing use cases that illustrate how embodiments may perform navigational jump condition detection 800. Use cases 802A-E each illustrate an example of one or more touch inputs that touch input analyzer 144 could use as the basis of a determination that navigational jump unit 146 needs to perform a navigational jump in conjunction with application 150.

In use case 802A, the analyzing determines that a navigational jump condition occurs when the one or more touch inputs include at least one touch input whose trajectory continues up to or past a boundary of the input device. In this use case, touch input 804A may be observed to continue to the right boundary of the touch screen, which causes detection of a navigational jump condition. In this specific example, such input may cause scrolling right to the end of the document.

In use case 802B, the analyzing determines that a navigational jump condition occurs when the one or more touch inputs include at least one touch input whose trajectory covers at least one full structural unit of the content. In this use case, touch input 804B may be observed to continue past three paragraphs on the touchscreen, which causes detection of a navigational jump condition. In this specific example, such input may select those three paragraph.

In use case 802C, the analyzing determines that a navigational jump condition occurs when the one or more touch inputs include at least one touch input whose trajectory covers at least one full display unit of the content. In this use case, touch input 804C may be observed to include one full screen's worth of content. In this specific example, such input may cause scrolling right by an increment of one screen's worth of content.

In use case 802D, the analyzing determines that a navigational jump condition occurs when the one or more touch inputs include a plurality of touch inputs whose trajectories have directions within a predefined tolerance of each other. Touch input 804D points to the right, and touch input 806D points to the right in a slightly downward direction (e.g., toward the lower part of the screen). Since they are so similar in direction, they may indicate a need for a navigational jump to the right. For example, such a jump could be to the end of a document, as in 802A.

In use case 802E, the analyzing determines that a navigational jump condition occurs when the one or more touch inputs correspond to one or more touch inputs wherein the speed of the touch inputs increases over time. While touch inputs 804E and 806E show trajectories and not speeds, use case 802E is intended to address the use case where multiple touch inputs with similar trajectories have increasing speed. While nuances of this approach are also discussed in mathematical touch analysis in conjunction with FIG. 7, overall 802E is intended to illustrate the idea that user 194 can invoke a jump with repeated touch inputs in similar directions with increasing speed.

These use cases are simply examples of one or more touch inputs that might cause touch input analyzer 144 to detect a need for a navigational jump. It may be recognized that embodiments may identify the need for a navigational jump condition as well as the parameters of that navigational jump condition on the basis of one or more touch inputs with other distinguishing characteristics or different relationships to each other. For example, certain multitouch gestures with certain relationships to each other may lead to a navigational jump, such as interpreting multiple pinch gestures to do a navigational jump whose purpose is to change zoom level.

Additionally, it should be noted, as will be discussed in connection with FIG. 9, that touch input analyzer 144 may customize its operation with data related to individual users.

Figure 9:
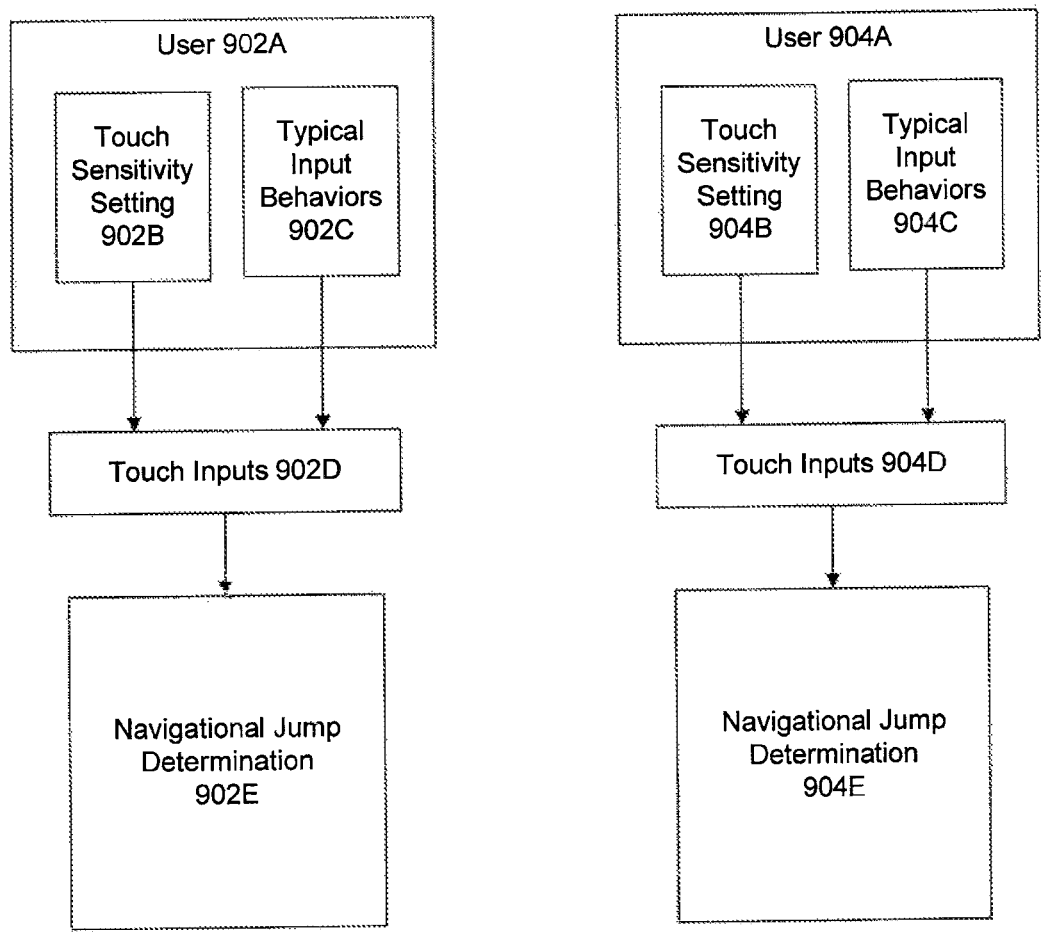
FIG. 9 is a diagram showing dataflow in the context of an embodiment that performs user-based analysis.

FIG. 9 is a diagram showing dataflow in the context of an embodiment that performs user-based analysis. User-based analysis 900 begins with user 902A and user 904A. Associated with user 902A are touch sensitivity setting 902B and typical input behaviors 902C. Similarly, associated with user 904A are touch sensitivity setting 904B and typical input behaviors 904C.

It is possible for each user to set their touch sensitivity setting manually, if it is desired. A touch sensitivity setting may indicate the relationship between the speed and trajectory of a touch input and how computing device reacts to the touch input. For example, if two users had different sensitivity settings, the same touch input might cause less scrolling for one user. FIG. 9 illustrates that touch sensitivity setting 902B may be used in conjunction with touch inputs 902D provided by user 902A in order to make navigational jump determination 902E. For example, for a user whose input device 180 is more sensitive, navigational jump determination 902E might make it easier for that user to cause a navigational jump in comparison to a user whose touch sensitivity setting causes input device 180 to be less sensitive.

Furthermore, user 902A may be associated with typical input behaviors 902C and user 904A may be associated with typical input behaviors 904C. In an embodiment, typical input behaviors 902C and 904C may be established using techniques such as training and machine learning. Typical input behaviors 902C and 904C may include various aspects that can be combined with relevant touch inputs 902D and 904D to help identify when it is appropriate to invoke a navigational jump.

For example, typical input behaviors 902C associated with user 902A and typical input behaviors 904C associated with user 904A may cause different navigational jump determinations 902E and 904E to emerge if the same touch inputs are provided. For example, user 902A might identify that a navigational jump should occur if a single touch input has a trajectory that continues to the edge of the screen, but this might not be provided for user 904A. Likewise, user 904A might have a different tolerance than user 902A when considering whether repeated gestures are to be considered to be in the same direction, when establishing if a navigational jump is to occur.

As discussed, typical input behaviors 902C and 904C can be established by machine leaning. For example, an embodiment may establish a training mode. In training mode, a user can provide computer system 100 with touch inputs as training data. Computer system can attempt to respond to the one or more touch inputs in a manner that is consistent with its inference of user intent, based on default rules that provide a starting point for inferring user intent. Users, such as user 902A and user 904A can then train computer system 100 by informing the system if its inference is correct. For example, computer system might receive a touch input whose trajectory proceeds off of the edge of the screen. Based on a default rule, computer system 100 could scroll to the end of the content. User 902A might accept this interpretation, and could accept this rule as a typical input behavior. However, user 904A might not want to accept this rule. User 904A might want computer system 100 to scroll one chapter of an e-book to the right (one structural unit) instead of actually going to the end of the document. User 904A could either have computer system 100 try again until it recommends what is desired, or train by specifying to computer system 100 in some way what the desired behavior is.

Thus, once computer system 100 is trained, it will become possible for computer system 100 to intelligently tailor its response to needs, habits, and preferences of specific users.

Embodiments offer many advantages for handling touch inputs. First, it is possible to use touch inputs in a way that directly perform a navigational jump, rather than having to repeat a gesture many times. By comparing multiple touch inputs or identifying touch inputs with specific distinguishing features, an embodiment can infer that a user wants to perform such a navigational jump, which can be much faster, more efficient, and more user-friendly than existing user interface approaches Additionally, it is possible to customize performing a navigational jump in a manner that allows the user to personalize how navigational jumps are determined to his or her individual needs and input habits. This feature is extremely helpful because it allows embodiments to make inferences about user inputs in a way that ensures that the inferences are more likely to be relevant and accurate, as opposed to making inferences with a "one-size-fits-all" approach.

Thus, embodiments represent a significantly improved means of handling touch inputs on a computing device.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for handling one or more touch inputs on a computing device, the method comprising:
   displaying at least a portion of application content on a display associated with the computing device;
   receiving one or more touch inputs from a user at an input device associated with the computing device;
   determining the one or more touch inputs comprise a first gesture and a second gesture performed in succession, wherein the first gesture comprises a drawing gesture which selects a portion of the application content defining a unit of application content, the defined unit of application content being a structure or area of the application content;
   determining the second gesture has a criteria of movement that satisfies a predetermined criteria;
   determining, in response to the second gesture having the criteria of movement satisfying the predetermined criteria, a plurality of units of the application content based on the second gesture, the determined plurality of units being determined in increments of the defined unit of application content, the determined plurality of units comprising a portion of the application content that is different than the selected portion of the application content; and
   changing the display of the application content by selecting the determined plurality of units, or scrolling the application content according to the determined plurality of units.

2. The method of claim 1, wherein each touch input is associated with a speed and trajectory, and wherein the predetermined criteria comprises at least one of a predetermined velocity and a predetermined direction.

3. The method of claim 1, wherein each touch input is associated with a speed and trajectory, and wherein the predetermined criteria comprises a velocity or acceleration curve.

4. The method of claim 1, wherein the one or more touch inputs comprise a plurality of swipes across the display performed in succession.

5. The method of claim 4, further comprising:
   determining an overall navigation direction based on the direction of a swipe of the greatest magnitude, the magnitude being determined by at least one of a length of the swipe and a velocity of the swipe.

6. The method of claim 1, wherein the one or more touch inputs comprise two or more swipes across the display, each having a trajectory and direction within a predefined tolerance of each other.

7. The method of claim 1, wherein the drawing gesture diagonally crosses over the selected portion of the application content.

8. The method of claim 1, wherein the selected portion is a paragraph of the application content.

9. The method of claim 1, wherein changing the display of the application content comprises visually selecting a number of paragraphs for manipulation based on the determined plurality of units and a direction of the second gesture.

10. The method of claim 1, wherein changing the display of the application content comprises scrolling the application content according to the determined plurality of units.

11. The method of claim 1, wherein changing the display of the application content comprises changing a zoom level for the application content.

12. A non-transitory machine-readable medium having machine-executable instructions stored thereon, which when executed by a machine or computer cause the machine or computer to perform a method, comprising:
   displaying, on a display coupled to the machine or computer, at least a portion of application content, the application content comprising a plurality of units of content;
   receiving one or more touch inputs from a user at an input device associated with the machine or computer;
   determining a plurality of gestures performed in succession from the one or more touch inputs, wherein a first gesture of the plurality of gestures comprises a drawing gesture selecting a portion of the application content defining a unit of application content, the defined unit of application content being a structure or an area of the application content;
   determining a plurality of units of the application content based on a criteria of movement associated with a second gesture of the plurality of gestures, wherein the determined plurality of units are determined in increments of the defined unit of application content and comprises a portion of the application content that is different than content within the area of the application content; and
   changing the display of the application content by selecting the determined plurality of units of content, or scrolling the application content according to the determined plurality of units of content.

13. The non-transitory machine-readable medium of claim 12, wherein the unit of content comprises an image or paragraph of text on a web page displayed by a web browser.

14. The non-transitory machine-readable medium of claim 12, wherein the unit of content comprises one or more features of the application content that are related to how the content is displayed in a particular environment.

15. The non-transitory machine-readable medium of claim 12, wherein a number of the plurality of units of application content is determined based on at least one of a length of the second gesture, a velocity of the second gesture, an acceleration of the second gesture, and a trajectory of the second gesture.

16. The non-transitory machine-readable medium of claim 12, wherein changing the display comprises performing a navigational jump that produces updated content from original content.

17. The non-transitory machine-readable medium of claim 12, further comprising:
   determining that an acceleration or a velocity or a trajectory of the second gesture satisfies a predetermined criteria before the plurality of units of application content is determined or the display is changed.

18. The non-transitory machine-readable medium of claim 12, changing the display of the application content comprises:
   determining, based on one or more of the plurality of gestures, whether to change the display of the application content by scrolling the determined plurality of units of content or by selecting the determined plurality of units.

19. A system, comprising:
   an input device;
   a display screen;
   a processor; and a memory having instructions thereon that, when executed by the processor, cause a computing device to:

display application content on the display screen;

receive one or more touch inputs from a user at the input device;

determine a series of gestures from the one or more touch inputs;

determine the series of gestures satisfies a predetermined criteria;

determine a plurality of units of the application content based on a first gesture and a second gesture of the series of gestures, the first gesture selecting a portion of the application content defining a first unit of the units and the second gesture defining a number of the determined plurality of units, including units that are different than the first unit, the plurality of units being determined in increments of the defined first unit of application content based on at least one of a length of the second gesture, a velocity of the second gesture, an acceleration of the second gesture, and a trajectory of the second gesture; and perform a navigational jump that produces updated content from original content, the navigational jump comprising a selection of the determined plurality of units, or scrolling the application content according to the determined plurality of units.

20. The system of claim 19, wherein the instructions further cause the computing device to:

determine the first gesture encircles a user-selected portion of the application content; and determine the first unit based on the user-selected portion.

\* \* \* \* \*